United States Patent [19]

Naul

[11] Patent Number: 4,500,583

[45] Date of Patent: Feb. 19, 1985

[54] HONEYCOMB STRUCTURE

[75] Inventor: George M. Naul, Granville, Ohio

[73] Assignee: Owens-Corning Fiberglas Corporation, Toledo, Ohio

[21] Appl. No.: 531,101

[22] Filed: Sep. 12, 1983

[51] Int. Cl.³ .............................................. B32B 3/12
[52] U.S. Cl. .................................. 428/116; 52/800; 52/806; 181/288; 428/118; 428/182; 428/184
[58] Field of Search ................. 428/73, 116, 117, 118, 428/182, 184; 156/197; 181/288, 292; 52/800, 806

[56] References Cited

U.S. PATENT DOCUMENTS

| | | | |
|---|---|---|---|
| 2,409,951 | 10/1946 | Nootens | 428/182 X |
| 2,477,852 | 8/1949 | Bacon | 428/116 |
| 2,909,784 | 10/1959 | Forsberg | 428/116 X |
| 2,919,472 | 1/1960 | Steele | 428/116 X |
| 2,983,640 | 5/1961 | Knoll et al. | 428/116 X |
| 3,018,205 | 1/1962 | Barut | 428/116 |
| 3,328,086 | 6/1967 | Johnston | 428/319.7 X |
| 3,366,525 | 1/1968 | Jackson | 156/197 |
| 3,379,594 | 4/1968 | Bruder | 428/116 X |
| 3,600,249 | 8/1971 | Jackson et al. | 428/116 X |
| 3,673,058 | 6/1972 | Jackson et al. | 428/118 |
| 3,700,552 | 10/1972 | Wonderly | 428/116 X |
| 3,915,777 | 10/1975 | Kaplan | 428/81 X |

OTHER PUBLICATIONS

The title page, the verso of the title page and p. 761 of Webster's Seventh New Collegiate Dictionary, G. & C. Merriam Company, publishers, Springfield, Mass.

Primary Examiner—Henry F. Epstein
Attorney, Agent, or Firm—Ronald C. Hudgens; Ted C. Gillespie; Paul J. Rose

[57] ABSTRACT

The honeycomb structure is formed by adhering corrugated sheet units of molded glass wool together.

6 Claims, 7 Drawing Figures

HONEYCOMB STRUCTURE

TECHNICAL FIELD

This invention relates generally to structural honeycomb or generally similar cellular core material, and more particularly to structural honeycomb made of molded glass wool.

BACKGROUND ART

U.S. Pat. No. 3,600,249 discloses honeycomb structure made of resin impregnated glass cloth. U.S. Pat. No. 3,673,058 discloses honeycomb structure having unidirectionally oriented glass strands in resin. Both of these patents are concerned with high strength to weight ratios.

DISCLOSURE OF THE INVENTION

In accordance with the invention, a honeycomb structure made of resin impregnated molded glass wool and having controlled crushability as an impact energy absorber is disclosed.

BRIEF DESCRIPTION OF THE DRAWINGS

The invention is hereinafter more fully described, reference being had to the accompanying drawings in which.

BEST MODE OF CARRYING OUT THE INVENTION

Figures 1, 2:
FIG. 1 is an end elevational view of a representative molded glass wool corrugated sheet unit constructed in accordance with the invention.
FIG. 2 is a side elevational view of the unit of FIG. 1.

With reference to the drawings, FIG. 1 shows a corrugated sheet unit 10 molded of glass wool and resin in accordance with the invention. The starting material may be spun glass wool wherein the glass fibers have a diameter of about 25 to 30 hundred thousandths of an inch. A blanket of glass wool one to two inches thick with about 20 to 25 percent by weight of an uncured binder such as urea-phenol-formaldehyde and a density of about one pound per cubic foot may be placed in an appropriate two-art mold, compressed to a thickness of about one-eighth of an inch and a density of six to twelve pounds per cubic foot, and held at about 450° F. for about five minutes before being removed from the mold. Several blankets may be molded at the same time if appropriate release sheets are inserted therebetween. Preferably the sheet units 10 are molded in a large size and cut into smaller strips.

Figure 3:
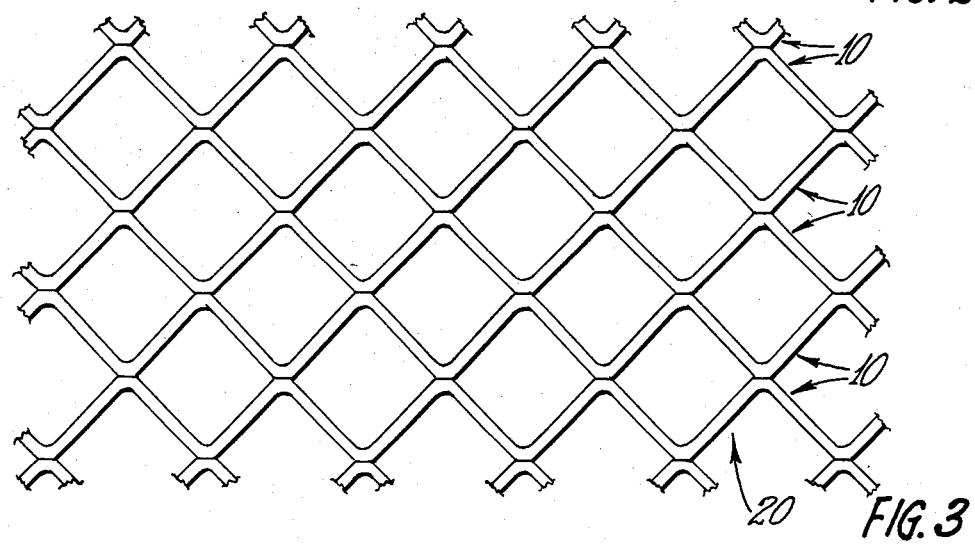
FIG. 3 is a fragmentary end elevational view of a honeycomb structure formed of molded glass wool corrugated sheets like that of FIGS. 1 and 2.

A plurality of the corrugated sheet units 10 are adhesively secured together to form a honeycomb structure 20 shown in FIG. 3. The molded glass wool honeycomb has controlled crushability and is less brittle and better in absorbing impact energy than similar honeycomb structure made of resin impregnated glass cloth. Further, the thickness and density of the molded glass wool sheets can be more readily varied to meet engineering design requirements than for honeycomb of glass cloth. The honeycomb structure of this invention is particularly useful in automobile doors for protection against side impact.

Figure 4:
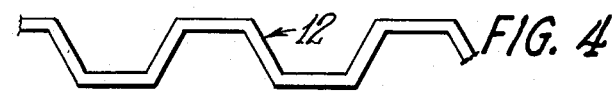
FIGS. 4 and 6 are views similar to FIG. 1 but illustrating alternative embodiments of molded glass wool corrugated sheet units.
Figure 5:
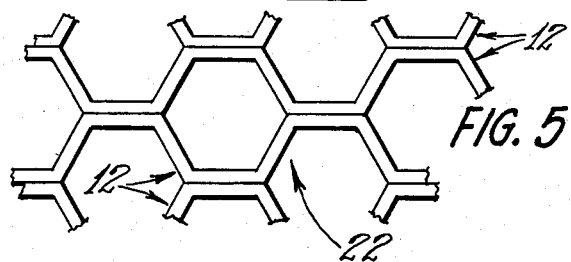
FIGS. 5 and 7 are views similar to FIG. 3 but illustrating alternative embodiments of honeycomb structures formed respectively of the corrugated sheet units of FIGS. 4 and 6.
Figure 6:
Figure 7:
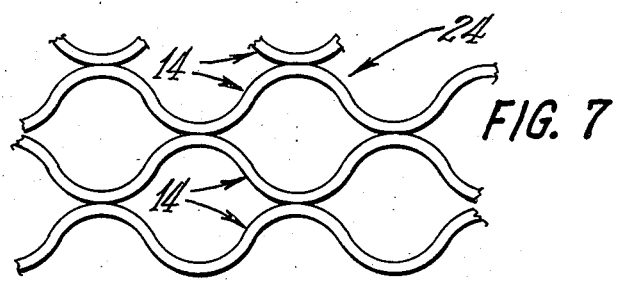

The glass wool sheet units can be molded in different shapes. FIGS. 4 and 6 illustrate two of such other shapes in the form of sheet units 12 and 14, and FIGS. 5 and 7 illustrate molded glass wool honeycomb structures 22 and 24 formed respectively of the sheet units 12 and 14.

I claim:

1. Honeycomb structure comprising corrugated sheet units molded of resin impregnated glass wool and adhered together to form a cellular core.

2. Honeycomb structure as claimed in claim 1 wherein cells of the cellular core are generally square shaped.

3. Honeycomb structure as claimed in claim 1 wherein cells of the cellular core are generally hexagonal.

4. Honeycomb structure as claimed in claim 1 wherein the sheet units are generally sinusoidal.

5. Honeycomb structure as claimed in claim 1 wherein the molded glass wool has a density of from six to twelve pounds per cubic foot.

6. Honeycomb structure as claimed in claim 1 wherein the resin impregnated glass wool from which the corrugated sheet units are molded contains about twenty percent resin by weight.

* * * * *